(12) United States Patent
  Zhao

(10) Patent No.: US 11,895,021 B2
(45) Date of Patent: Feb. 6, 2024

(54) MESSAGE SENDING AND RECEIVING METHOD, APPARATUS, AND SYSTEM

(71) Applicant: HUAWEI TECHNOLOGIES CO., LTD., Guangdong (CN)

(72) Inventor: Kun Zhao, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 63 days.

(21) Appl. No.: 17/135,097

(22) Filed: Dec. 28, 2020

(65) Prior Publication Data

US 2021/0119911 A1 Apr. 22, 2021

Related U.S. Application Data

(63) Continuation of application No. PCT/CN2019/092445, filed on Jun. 23, 2019.

(30) Foreign Application Priority Data

Jul. 10, 2018 (CN) .......................... 201810752158.2

(51) Int. Cl.
  *H04L 12/723* (2013.01)
  *H04L 12/715* (2013.01)
  (Continued)

(52) U.S. Cl.
  CPC .......... *H04L 45/50* (2013.01); *H04L 12/4641* (2013.01); *H04L 45/04* (2013.01); *H04L 45/66* (2013.01); *H04L 47/225* (2013.01)

(58) Field of Classification Search
  CPC ..... H04L 45/50; H04L 12/4641; H04L 45/04; H04L 45/66; H04L 47/225; H04L 12/4625; H04L 12/4633; H04L 45/38
  See application file for complete search history.

(56) References Cited

U.S. PATENT DOCUMENTS 9,106,530 B1   8/2015  Wang
9,807,035 B1 * 10/2017 Hanks ..................... H04L 49/15
               (Continued)

FOREIGN PATENT DOCUMENTS

CN   102045232 A    5/2011
CN   104253759 A   12/2014
             (Continued)

OTHER PUBLICATIONS

S. Hares et al., Dissemination of Flow Specification Rules, draft-ietf-idr-rfc5575bis-08. Jun. 21, 2018, 33 pages.
(Continued)

*Primary Examiner* — Luat Phung
(74) *Attorney, Agent, or Firm* — WOMBLE BOND DICKINSON (US) LLP

(57) ABSTRACT

A first network device sends a border gateway protocol (BGP) message to a second network device. The BGP message includes Ethernet virtual private network network layer reachability information (EVPN NLRI) and first information. The first information indicates a first maximum rate at which the second network device sends traffic to the first network device based on the EVPN NLRI. When the second network device sends the traffic to the first network device based on the EVPN NLRI, a first-type rate is less than or equal to the first maximum rate. According to the method in this application, less public network bandwidth is occupied, and overheads of the network device can be reduced.

14 Claims, 7 Drawing Sheets

(51) Int. Cl.
  *H04L 45/50* (2022.01)
  *H04L 12/46* (2006.01)
  *H04L 45/02* (2022.01)
  *H04L 45/00* (2022.01)
  *H04L 47/22* (2022.01)

(56) References Cited

U.S. PATENT DOCUMENTS

| | | | | |
|---|---|---|---|---|
| 2012/0102228 | A1* | 4/2012 | Cugini | ............... H04L 45/04 709/242 |
| 2013/0117449 | A1* | 5/2013 | Hares | ................ H04L 45/04 709/225 |
| 2016/0021015 | A1 | 1/2016 | Thoria et al. | |
| 2017/0317919 | A1 | 11/2017 | Fernando et al. | |
| 2018/0006959 | A1 | 1/2018 | Natu et al. | |

FOREIGN PATENT DOCUMENTS

| | | |
|---|---|---|
| CN | 107018056 A | 8/2017 |
| CN | 107124347 A | 9/2017 |
| CN | 107231249 A | 10/2017 |
| CN | 107592262 A | 1/2018 |
| CN | 107911495 A | 4/2018 |
| CN | 108234312 A | 6/2018 |
| WO | 2017107814 A1 | 6/2017 |

OTHER PUBLICATIONS

Chenye, "Implementation and Research of EVPN Based on BGP Protocol", Nanjing University of Posts and Telecommunications, Apr. 2017, with an English abstract, total 73 pages.

Y. Rekhter et al., A Border Gateway Protocol 4 (BGP-4), Network Working Group, Request for Comments: 1771, Mar. 1995, total 57 pages.

A. Sajassi, Ed. et al., "BGP MPLS-Based Ethernet VPN", Request for Comments: 7432, Internet Engineering Task Force (IETF); ISSN: 2070-1721; Feb. 2015, total 56 pages.

T. Bates et al., Multiprotocol Extensions for BGP-4, Network Working Group, Request for Comments: 2858, Jun. 2000, total 11 pages.

S. Mohanty et al., "BGP EVPN Flood Traffic Optimization; draft-mohanty-bess-evpn-bum-opt-00", BESS WorkGroup Internet-Draft; Intended status: Standards Track, Mar. 5, 2018, total 9 pages.

T. Bates et al., Multiprotocol Extensions for BGP-4, Network Working Group, Request for Comments: 4760, Jan. 2007, total 12 pages.

A. Sajassi, Ed. et al., BGP MPLS-Based Ethernet VPN, Internet Engineering Task Force (IETF), Request for Comments: 7432, Feb. 2015, total 56 pages.

* cited by examiner

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | B | M | U | K | 4 | 5 | 6 | 7 | 8 | 9 | 0 | 1 |
| 0X06 | | | | | | | | 0X07 | | | | | | | | | | | | | | | 1 | | | | | | | | |
| Type (Type) | | | | | | | | Subtype (Subtype) | | | | | | | | Flag (Flag) | | | | | | | | Reserved (Reserved) | | | | | | | |
| Bandwidth (Bandwidth) | | | | | | | | | | | | | | | | | | | | | | | | | | | | | | | |

FIG. 5

```
+-+-+-+-+-+-+-+-+-+-+-+-+-+-+-+-+-+-+-+-+-+-+-+-+-+-+-+-+-+-+-+-+
| Type = 0x06   | Subtype = 0x06 |    K = 1      | Reserved = 0  |
+-+-+-+-+-+-+-+-+-+-+-+-+-+-+-+-+-+-+-+-+-+-+-+-+-+-+-+-+-+-+-+-+
|                      Bandwidth = 10000                        |
+-+-+-+-+-+-+-+-+-+-+-+-+-+-+-+-+-+-+-+-+-+-+-+-+-+-+-+-+-+-+-+-+
```

FIG. 5a

MESSAGE SENDING AND RECEIVING METHOD, APPARATUS, AND SYSTEM

CROSS-REFERENCE TO RELATED APPLICATIONS

This application is a continuation of International Application No. PCT/CN2019/092445, filed on Jun. 23, 2019, which claims priority to Chinese Patent Application No. 201810752158.2, filed on Jul. 10, 2018. The disclosures of the aforementioned applications are hereby incorporated by reference in their entireties.

TECHNICAL FIELD

This application relates to the field of communications technologies, and in particular, to a message sending and receiving method, an apparatus, and a system in an Ethernet virtual private network (EVPN).

BACKGROUND

An EVPN is a network that provides layer 2 network interworking virtual private network (VPN) in a multi-protocol label switching (MPLS) network. Currently, an EVPN technology is used as a mainstream solution for carrying layer 2 services in network designs of operators. In the EVPN technology, a border gateway protocol (BGP) is used as a protocol of a control plane to learn a media access control (MAC) address between provider edge (PE) devices. A process of learning and advertising the MAC address is implemented on the control plane, to greatly reduce MAC address expansion in a traffic flooding manner. Multi-homing access to the EVPN by a customer edge (CE) device is supported, to facilitate load balancing. In the EVPN technology, traffic forwarding is mainly classified into known unicast traffic forwarding, and broadcast, unknown unicast, and multicast (BUM) traffic forwarding. Both known unicast traffic and BUM traffic are forwarded based on a route from a remote device. In an operator network, a link bandwidth is limited. If traffic is not limited, congestion may occur. As a result, important traffic is discarded. Therefore, the traffic of the interface needs to be limited. In a current solution, PE traffic is limited according to a PE local policy, and EVPN traffic cannot be effectively managed. For example, there are problems, a wasted bandwidth, and a high device processing pressure.

SUMMARY

This application provides a message sending and receiving method, a network device, and a system, to effectively manage EVPN traffic, help reduce a public network bandwidth occupied by invalid traffic, and reduce a traffic processing pressure of the network device.

According to a first aspect, this application provides a message sending method. The method includes: A first network device generates a BGP message. The BGP message includes EVPN network layer reachability information (NLRI) and first information. The first information indicates a first maximum rate at which a second network device sends traffic to the first network device based on the EVPN NLRI. The first network device sends the BGP message to the second network device.

According to the method, when advertising a BGP EVPN route to another network device, the first network device dynamically advertises, to the another network device, a limit on a rate of traffic that can be received by the first network device. Therefore, a local device can control a rate of traffic sent by a remote device to prevent the rate of traffic sent by the remote device to the local device from exceeding a maximum rate allowed by the local device. When the rate of the traffic sent by the remote device to the local device exceeds the maximum rate advertised by the local device (namely, the maximum rate of traffic that can be received by the local device), the local device may be incapable of processing extra traffic and discards the extra traffic. In this application, the extra traffic is referred to as invalid traffic. Therefore, the technical solutions provided in this application can effectively reduce a public network bandwidth occupied by the invalid traffic. In addition, generating and sending the extra traffic by the remote device causes extra overheads, and transmitting the extra traffic by a public network device also causes extra overheads. The technical solutions provided in this application help reduce the overheads of the remote device and the public network device. The invalid traffic may indicate traffic that is sent by the remote device to the local device over a public network but is discarded because a rate of the traffic exceeds a local-end rate limit.

According to a second aspect, this application provides a message receiving method. A second network device receives a BGP message from a first network device. The BGP message includes EVPN NLRI and first information. The first information indicates a first maximum rate at which the second network device sends traffic to the first network device based on the EVPN NLRI. The second network device sends the traffic to the first network device at a first-type rate based on the EVPN NLRI and the first information. The first-type rate is less than or equal to the first maximum rate.

According to the method, after receiving the BGP message sent by the first network device, the second network device generates a BGP EVPN route based on information carried in the BGP message, and sends the traffic to the first network device at the rate not greater than the first maximum rate based on the BGP EVPN route and indication of the first information. In this way, when the second network device sends the traffic to the first network device, the rate of the traffic meets a rate limit of traffic that can be received by the first network device. This reduces a public network bandwidth occupied by invalid traffic. In addition, overheads caused by generating and sending the invalid traffic by the second network device and overheads caused by transmitting the invalid traffic by a public network device are also reduced.

In a possible implementation, the BGP message further includes second information. The second information indicates a second maximum rate at which the second network device sends the traffic to the first network device based on the EVPN NLRI. A type of a rate limited by the first maximum rate is different from a type of a rate limited by the second maximum rate.

In a possible implementation, the second network device sends the traffic to the first network device at the first-type rate and a second-type rate based on the EVPN NLRI, the first information, and the second information. The second-type rate is less than or equal to the second maximum rate. In this way, in a same BGP message, different types of rates may be limited. For example, only the first-type rate may be limited, or both the first-type rate and the second-type rate may be limited, to improve traffic management flexibility.

In a possible implementation, the first-type rate is a committed information rate (CIR) or a peak information rate (PIR).

In a possible implementation, the second-type rate is a CIR or a PIR.

In a possible implementation, the rate limited by the first maximum rate is a CIR or a PIR.

In a possible implementation, the rate limited by the second maximum rate is a CIR or a PIR.

In a possible implementation, the type of the rate limited by the first maximum rate is the first type, and the type of the rate limited by the second maximum rate is the second type.

In a possible implementation, the first-type rate is the CIR, and the rate limited by the first maximum rate is the CIR. The second-type rate is the PIR, and the rate limited by the first maximum rate is the PIR.

In a possible implementation, the first-type rate is the PIR, and the rate limited by the first maximum rate is the PIR. The second-type rate is the CIR, and the rate limited by the second maximum rate is the CIR.

In a possible implementation, the BGP message further includes third information, and the third information indicates the type of the rate limited by the first maximum rate.

In a possible implementation, the BGP message further includes fourth information, and the fourth information indicates a type of the traffic. In this way, accurate traffic management can be implemented for different types of traffic. For example, the traffic management can be performed on known unicast traffic, broadcast traffic, multicast traffic, or unknown unicast traffic.

In a possible implementation, the first information, the second information, the third information, and/or the fourth information are/is carried in an extended community attribute of the BGP message. The extended community attribute may be referred to as a traffic suppression attribute, and is one extended community attribute newly defined in a BGP protocol, and is used to manage EVPN traffic. One BGP message can carry a plurality of known traffic attributes to limit the different types of rates separately and/or limit the rates of the different types of traffic.

According to a third aspect, an embodiment of this application provides a first network device. The first network device includes a memory and a processor connected to the memory. The processor is configured to execute a computer-readable instruction in the memory to perform the following operations: generating a BGP message, where the BGP message includes EVPN NLRI and first information, and the first information indicates a first maximum rate at which a second network device sends traffic to the first network device based on the EVPN NLRI; and sending the BGP message to the second network device.

In a possible implementation, the BGP message further includes second information. The second information indicates a second maximum rate at which the second network device sends the traffic to the first network device based on the EVPN NLRI. A type of a rate limited by the first maximum rate is different from a type of a rate limited by the second maximum rate.

In this way, the first network device may limit different types of rates in one BGP message. For example, only a first-type rate may be limited, or both a first-type rate and a second-type rate may be limited, to improve traffic management flexibility.

In a possible implementation, the first-type rate is a CIR or a PIR.

In a possible implementation, the second-type rate is a CIR or a PIR.

In a possible implementation, the rate limited by the first maximum rate is a CIR or a PIR.

In a possible implementation, the rate limited by the second maximum rate is a CIR or a PIR.

In a possible implementation, the type of the rate limited by the first maximum rate is the first type, and the type of the rate limited by the second maximum rate is the second type.

In a possible implementation, the first-type rate is the CIR, and the rate limited by the first maximum rate is the CIR. The second-type rate is the PIR, and the rate limited by the first maximum rate is the PIR.

In a possible implementation, the first-type rate is the PIR, and the rate limited by the first maximum rate is the PIR. The second-type rate is the CIR, and the rate limited by the second maximum rate is the CIR. In a possible implementation, the BGP message further includes third information, and the third information indicates the type of the rate limited by the first maximum rate.

In a possible implementation, the BGP message further includes fourth information, and the fourth information indicates a type of the traffic. In this way, accurate traffic management can be implemented for different types of traffic.

In a possible implementation, the first information, the second information, the third information, and/or the fourth information are/is carried in an extended community attribute of the BGP message. The extended community attribute may be referred to as a traffic suppression attribute, and is one extended community attribute newly defined in a BGP protocol, and is used to manage EVPN traffic.

According to a fourth aspect, an embodiment of this application provides a second network device. The second network device includes a memory and a processor connected to the memory. The processor is configured to execute a computer-readable instruction in the memory to perform the following operations: receiving a BGP message from a first network device, where the BGP message includes EVPN NLRI and first information, and the first information indicates a first maximum rate at which the second network device sends traffic to the first network device based on the EVPN NLRI; and sending the traffic to the first network device at a first-type rate based on the EVPN NLRI and the first information, where the first-type rate is less than or equal to the first maximum rate.

In a possible implementation, the BGP message further includes second information. The second information indicates a second maximum rate at which the second network device sends the traffic to the first network device based on the EVPN NLRI. A type of a rate limited by the first maximum rate is different from a type of a rate limited by the second maximum rate. That the traffic is sent to the first network device at the first-type rate based on the EVPN NLRI and the first information includes:

That the traffic is sent to the first network device at a second-type rate based on the EVPN NLRI and the second information.

The second-type rate is less than or equal to the second maximum rate.

In this way, in a same BGP message, different types of rates may be limited. For example, only the first-type rate may be limited, or both the first-type rate and the second-type rate may be limited, to improve traffic management flexibility.

In a possible implementation, the first-type rate is a CIR or a PIR.

In a possible implementation, the second-type rate is a CIR or a PIR.

In a possible implementation, the rate limited by the first maximum rate is a CIR or a PIR.

In a possible implementation, the rate limited by the second maximum rate is a CIR or a PIR.

In a possible implementation, the type of the rate limited by the first maximum rate is the first type, and the type of the rate limited by the second maximum rate is the second type.

In a possible implementation, the first-type rate is the CIR, and the rate limited by the first maximum rate is the CIR. The second-type rate is the PIR, and the rate limited by the first maximum rate is the PIR.

In a possible implementation, the first-type rate is the PIR, and the rate limited by the first maximum rate is the PIR. The second-type rate is the CIR, and the rate limited by the second maximum rate is the CIR. In a possible implementation, the BGP message further includes third information, and the third information indicates the type of the rate limited by the first maximum rate.

In a possible implementation, the BGP message further includes fourth information, and the fourth information indicates a type of the traffic. In this way, accurate traffic management can be implemented for different types of traffic.

In a possible implementation, the first information, the second information, the third information, and/or the fourth information are/is carried in an extended community attribute of the BGP message. The extended community attribute may be referred to as a traffic suppression attribute, and is one extended community attribute newly defined in a BGP protocol, and is used to manage EVPN traffic.

According to a fifth aspect, an embodiment of this application provides a communications system, including the first network device provided in the third aspect or any possible implementation and the second network device provided in the fourth aspect or any possible implementation.

According to a sixth aspect, an embodiment of this application provides a computer-readable storage medium. The computer-readable storage medium stores an instruction. When the instruction is run on a computer, the computer is enabled to perform the method according to the first aspect, the second aspect, any possible implementation of the first aspect, or any possible implementation of the second aspect.

According to the method, the network device, and the system that are provided in the embodiments of this application, when the BGP message is used to advertise the BGP EVPN route to the remote device, rate information associated with the BGP EVPN route is carried in the BGP message. In this way, when sending the traffic to the remote device based on the BGP EVPN route, the network device manages the EVPN traffic based on the rate information, so that the network device sends traffic to the remote network device at the rate that is not greater than the maximum rate carried in the rate information. Therefore, part of traffic that exceeds a traffic bandwidth of the remote device is not sent to the public network. This reduces the public network bandwidth occupied by the traffic and reduces the traffic processing pressure of the device.

BRIEF DESCRIPTION OF DRAWINGS

FIG. 5 is a schematic diagram of a function of a specific traffic suppression attribute according to an embodiment of this application;

FIG. 5a is a schematic diagram of a traffic suppression attribute used for a MAC route according to an embodiment of this application;

DESCRIPTION OF EMBODIMENTS

The following describes technical solutions of embodiments in this application with reference to the accompanying drawings. A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Ordinal numbers such as "1", "2", "3", "4", "first", "second", "third", and "fourth" in this application are used to distinguish between a plurality of objects, but are not used to limit a sequence of the plurality of objects.

"A and/or B" mentioned in this application should be understood as including the following cases: Only A is included, only B is included, or both A and B are included.

In this application, an execution body of method operations is referred to as a "local end", and a network element that communicates with the execution body is referred to as a "remote end". These can be understood by a person skilled in the art.

For an EVPN technology in this application, refer to a description in request for comments (RFC for short) 7432 of the internet engineering task force (IETF for short). The RFC 7432 is incorporated in this application by reference in its entirety.

In this application, an "operator network" may also be referred to as a "backbone network provided by a service provider", a "service provider network", or a "public network". The foregoing different terms may be often used interchangeably.

Figure 1:
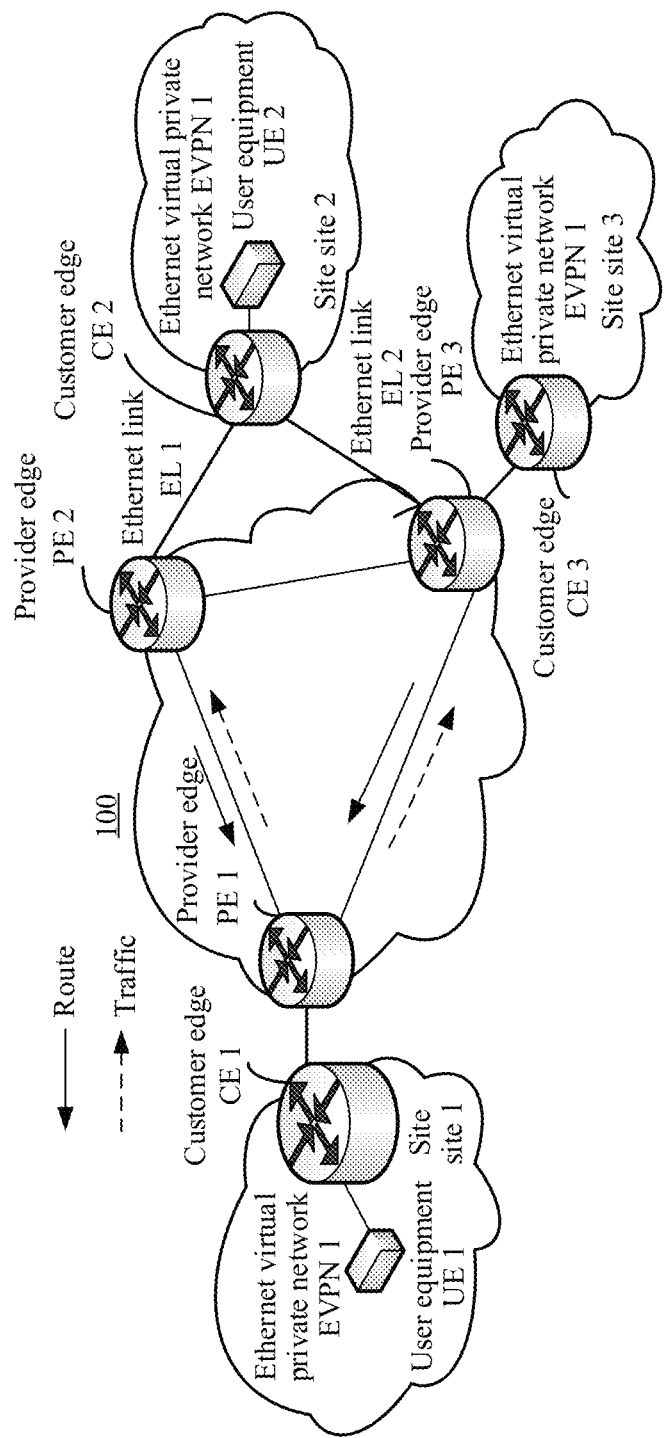
FIG. 1 is a schematic diagram of an EVPN network architecture according to an embodiment of this application.

FIG. 1 is a schematic diagram of an EVPN to which an embodiment of this application is applied. As shown in FIG. 1, a network 100 includes a backbone network and a plurality of EVPN sites (site) provided by a service provider. The network 100 includes three CE devices and three PE devices. The network 100 may further include one or more P devices (not shown in the figure). A plurality of P device, such as P routers are backbone routers in the backbone network, and are not directly connected to a CE device of a user. A P device has a basic MPLS forwarding capability, maintains a route to a PE device, and does not need to learn of route information of the VPN. As shown in FIG. 1, the three CE devices are a CE 1, a CE 2, and a CE 3. A CE device is a customer network edge device and has an interface that is directly connected to a PE device. The CE device may be a router, a switch, or a host. The CE device cannot "perceive" existence of the EVPN, and does not need to support multi-protocol label switching (MPLS). The three PE devices are a PE 1, a PE 2, and a PE 3. The PE device is an edge device in a service provider network, and may be a router or a layer 3 switch. The PE device is directly connected to the CE device of the user, and all processing for the EVPN occurs on the PE. In a mobile bearer network, the CE device may be a base transceiver station (BTS for short). The PE device may be a radio network controller site gateway (RSG for short), and may be connected to a base station controller (BSC for short) or a radio network controller (RNC for short). After learning of MAC information from a CE, a local PE exchanges with another PE, the route information of the EVPN by using a BGP. The local PE maintains route information of the EVPN directly connected to the local PE and route information of the EVPN, advertised by a remote PE. A plurality of EVPN sites include sites 1 to 3, and the site 1, the site 2, and the site 3 belong to a same EVPN instance EVPN 1. The PE 1 is directly connected to the CE 1. The PE 3 is directly connected to the CE 3. The CE 2 is dual-homed to the PE 2 and the PE 3 through an Ethernet link (EL) 1 and an EL 2. A group of Ethernet links including the two Ethernet links is an Ethernet segment (ES). An Ethernet segment identifier (ESI) is a unique non-zero identifier, and is used to identify the Ethernet segment ES. The PE 1 and the PE 2 are a pair of BGP peers (peer), the PE 1 and the PE 3 are a pair of BGP peers, and the PE 2 and the PE 3 are a pair of BGP peers. In an EVPN scenario, a BGP peer may also be referred to as an EVPN peer. "A pair of BGP peers" may be understood as that one device is a BGP peer of the other device. For example, that the PE 1 and the PE 2 are a pair of BGP peers may be understood as that the PE 1 is a BGP peer of the PE 2, or the PE 2 is a BGP peer of the PE 1. The BGP peer may also be referred to as a BGP neighbor. Correspondingly, an EVPN peer may also be referred to as an EVPN neighbor. In this application, for ease of description, the BGP peer is used in all subsequent embodiments. The BGP peer is established by using an OPEN message specified in the BGP, and the established BGP peer is maintained by using a keepalive message. For implementation of the OPEN message and the keepalive message, refer to related descriptions in IETF RFC 2858 and IETF RFC 1771. In addition, a route reflector (RR for short) may be deployed between two devices for establishing the BGP peer, to complete establishment of the BGP peer by using the RR.

It should be understood that FIG. 1 shows only an example of three PE devices, three CE devices, and three EVPN sites. The network may include any other quantity of PE devices, CE devices, and EVPN sites, and may include any quantity of P devices. This is not limited in this embodiment of this application.

It should be further noted that the PE and the PE device have a same meaning in the embodiment of this application. Likewise, the CE and the CE device have a same meaning.

Figure 2:
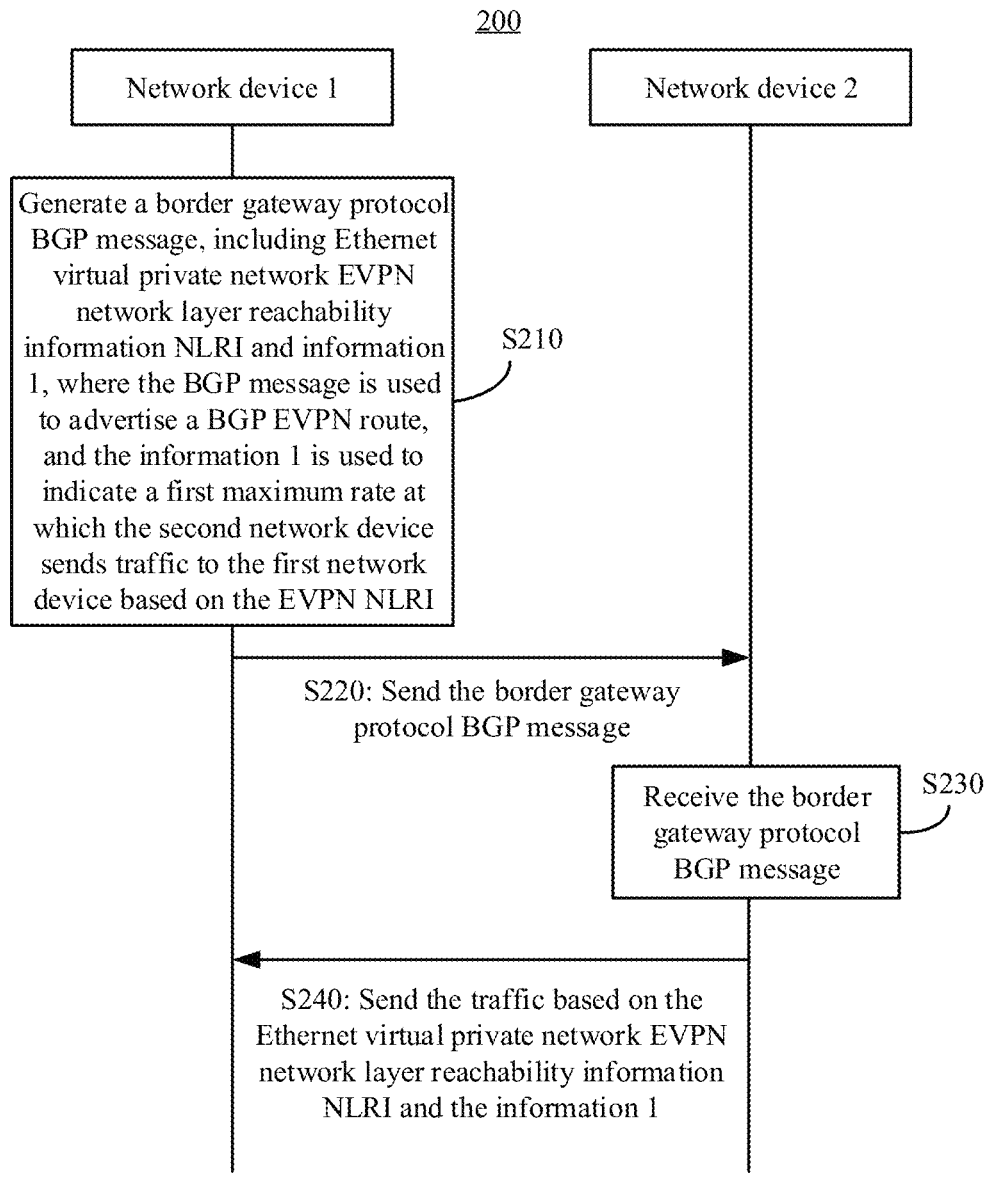
FIG. 2 is a schematic flowchart of a message sending and receiving method according to an embodiment of this application.

The following describes in detail a message sending and receiving method 200 according to an embodiment of this application with reference to FIG. 2. A network architecture to which the method 200 is applied includes at least a network device 1, and a network device 2. The network device 1 and the network device 2 are a pair of BGP peers. Both the network device 1 and the network device 2 may be PE devices. For example, the network device 1 may be the PE 2 shown in FIG. 1, and the network device 2 may be the PE 1 shown in FIG. 1. The network architecture may be a network architecture shown in FIG. 1. The method 200 includes the following operations.

S210: The network device 1 generates a BGP message, where the BGP message includes EVPN NLRI and information 1.

S220: The network device 1 sends the BGP message to the network device 2.

Figure 3A:
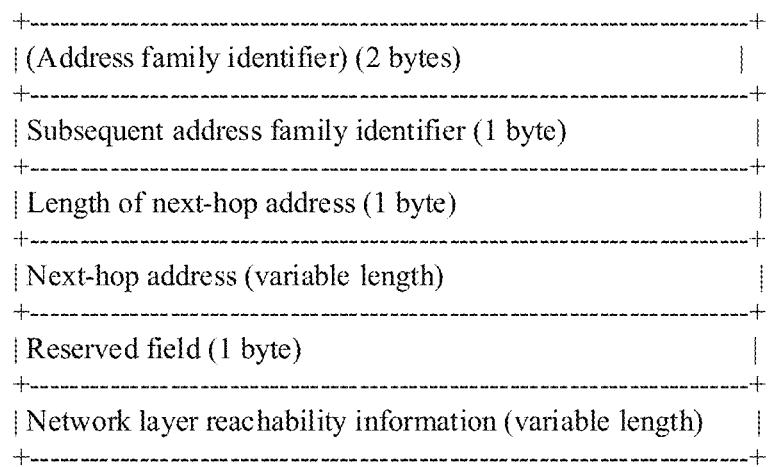
FIG. 3a is a schematic diagram of a format of an MP_REACH_NLRI attribute according to an embodiment of this application.
Figure 3B:
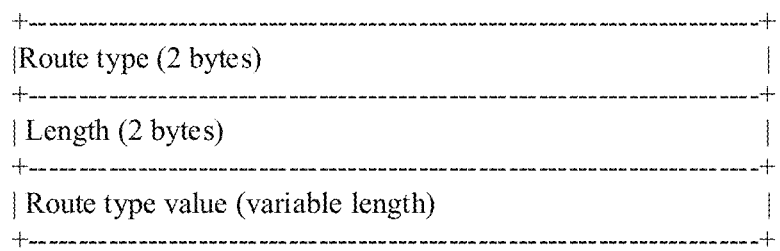
FIG. 3b is a schematic diagram of a format of an EVPN NLRI field according to an embodiment of this application.

The BGP message may be, for example, a BGP update message. The EVPN NLRI is a piece of BGP NLRI defined in a BGP protocol. A BGP EVPN route advertised by the network device 1 to the network device 2 includes the EVPN NLRI. The BGP EVPN route includes but is not limited to a MAC/IP advertisement route, an Ethernet auto-discovery route (Ethernet A-D route), an inclusive multicast Ethernet tag route (IMET route), and an Ethernet segment route. The EVPN NLRI is carried in a Multiprotocol Reachable NLRI (MP_REACH_NLRI) attribute. The MP_REACH_NLRI attribute is an attribute defined in the BGP update message, and a specific format is shown in FIG. 3a. The attribute includes an address family identifier (AFI) field and a subsequent address family identifier (SAFI) field. A value of the AFI field is used to indicate an L2VPN, and for example, is 25. A value of the SAFI field is used to indicate an EVPN, and for example, is 70. The MP_REACH_NLRI attribute further includes a "Length of Next Hop Network Address h" field and a "Network Address of Next Hop" field. The Network Address of Next Hop field is used to carry a next-hop network address, and the next-hop network address is a network address of the network device 1, for example, a loopback address of the network device 1. The loopback address may be an IP address configured on a loopback interface of a network device (for example, a router or a switch), and is usually used as a network device identifier (for example, a 32-bit-mask IPv4 address: 10.10.1.1/32). This can be understood by a person skilled in the art. The MP_REACH_NLRI attribute further includes an NLRI field, which is used to indicate the EVPN in the L2VPN with reference to values of the AFI field and the SAFI field. The NLRI field is an EVPN NLRI field. As shown in FIG. 3b, the EVPN NLRI field includes, for example, a 2-byte route type field, a 2-byte length field, and a route type specific field with a variable length. It should be noted that lengths of the route type field and the length field are not limited in this application. The route type field is used to indicate different BGP EVPN route types.

The following uses the MAC/IP advertisement route as an example to describe the EVPN NLRI field. In this application, the EVPN NLRI and the EVPN NLRI field have a same meaning. The MAC/IP advertisement route includes a MAC advertisement route and an IP advertisement route, which are respectively used to guide layer 2 packet forwarding and layer 3 packet forwarding.

Figure 3C:
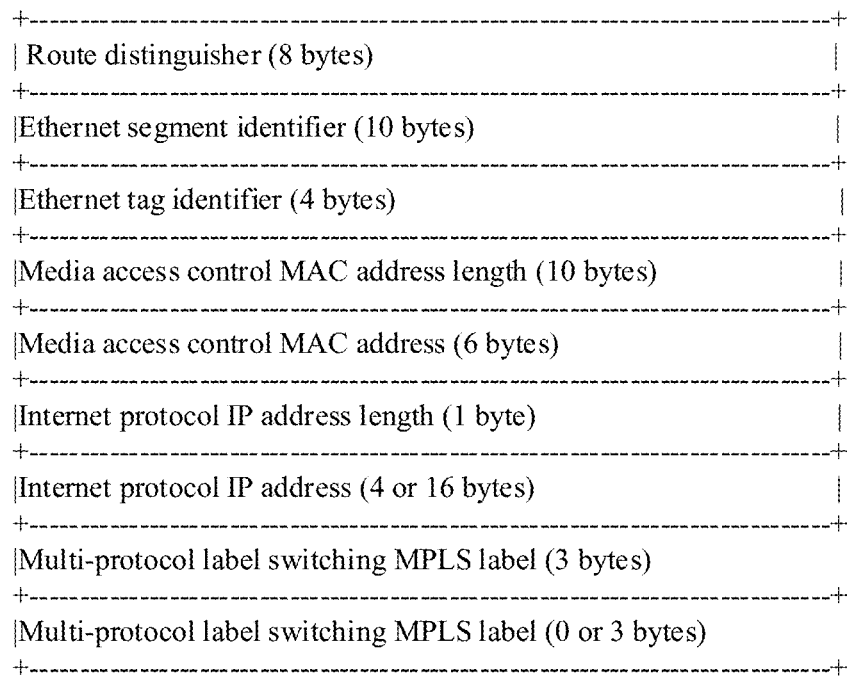
FIG. 3c is a schematic diagram of a format of a MAC/IP advertisement route according to an embodiment of this application.
Figure 3D:
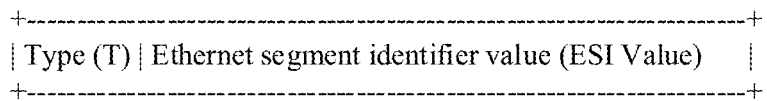
FIG. 3d is a schematic diagram of a format of an ESI field according to an embodiment of this application.

In the MAC/IP advertisement route, a value of the route type field is 2, and the route type specific field is used to record specifics of the MAC/IP advertisement route. As shown in FIG. 3c, the MAC/IP advertisement route includes an 8-byte route distinguisher (RD) field, a 10-byte Ethernet segment identifier (ESI) field, a 4-byte Ethernet tag identifier (ID) field, a 1-byte MAC address length field, a 6-byte MAC address field, a 1-byte IP address length field, a 0-byte, a 4-byte or 16-byte IP address field, a 3-byte MPLS label 1 field, and a 0-byte or 3-byte MPLS label 2 field. The MPLS label 2 is used to guide layer 3 traffic forwarding. In the MAC advertisement route field, the MPLS label 2 field is 0. A format of the ESI field shown in FIG. 3c is shown in FIG. 3d, and includes a type (Type, T) field and an ESI value (V) field. The type field is used to indicate a manner of generating an ESI. Two common generation manners are a type 0 and a type 1. The type 0 indicates that the ESI is generated through manual configuration. The type 1 indicates that a link aggregation control protocol (LACP for short) runs between a PE and a CE. A value range of the ESI value field is 0 to 0xFF, where "0x" indicates a hexadecimal system. For details about generation and setting of an ES and the ESI, refer to chapter 5 in RFC 7432. A MAC address included in the MAC advertisement route is a MAC address of a CE device connected to the network device 1 or a MAC address of user equipment managed by the CE device. In this application, the MAC advertisement route is also briefly referred to as a MAC route.

For definitions of the BGP update message and the MP_REACH_NLRI attribute, refer to descriptions in RFC 4760. For a definition of the EVPN NLRI field, refer to descriptions in RFC 7432.

With reference to a scenario shown in FIG. 1, the following uses an example to describe a process in which the PE device advertises the BGP EVPN route.

The PE 2 learns of a MAC address of user equipment (UE) 2 in the site 2, for example, a MAC 1, and the PE 2 advertises a MAC route to the PE 1 through a BGP update message. The PE 3 does not learn of the MAC address of the UE 2 in the site 2. The PE 3 advertises an Ethernet auto-discovery route (Ethernet A-D route) to the PE 1. Therefore, the PE 1 learns of, in an aliasing manner, that the PE 1 can reach the UE 2 through the PE 3. In this way, when unicast traffic sent by UE 1 to the UE 2 is transmitted through the PE 1, the PE 1 may perform load balancing processing on the unicast traffic. The unicast traffic is forwarded to the CE 2 through the PE 2 and the PE 3. In this way, the UE 1 and the UE 2 can communicate with each other in the EVPN 1.

In addition to the MAC route and the Ethernet A-D route, in an EVPN network, a PE device needs to send, to another PE in a same EVPN instance, BUM traffic from a CE device. In this scenario, the PE that receives the BUM traffic needs to flood (flood) unknown unicast traffic to another PE device. Therefore, in the EVPN, after PE devices are deployed, each PE device needs to advertise an IMET route to another PE device to guide BUM packet forwarding. Under the guidance of the IMET route, the PE device that receives the IMET route forwards the BUM traffic to the transmit end PE.

In a P2P EVPN service, for example, if a P2P EVPN is deployed between the PE 1 and the PE 2, after learning of the MAC address of the UE 2 in the site 2, the PE 2 advertises a per-AD-EVI route to the PE 1 through the BGP update message. The per-AD-EVI route is a type of the Ethernet A-D route. In a P2P scenario, all packets are processed in a broadcast manner. The per-AD-EVI route is used to guide packet forwarding in the P2P scenario.

For specific details about the BGP EVPN route, the MAC advertisement route, the Ethernet A-D route, and the IMET route, and details about how the PE device implements load balancing in the aliasing manner, refer to RFC 7432. Related content in this document is incorporated in this specification by reference. For brevity, details are not described herein.

The information 1, also referred to as rate information 1, is used to indicate a first maximum rate at which the network device 2 sends traffic to the network device 1 based on the BGP EVPN route sent by the network device 1. A type of a rate limited by the first maximum rate may be a CIR or a PIR. For example, when the type of the rate limited by the first maximum rate is the CIR, the CIR at which the network device 2 sends the traffic to the network device 1 cannot exceed the first maximum rate.

Figure 4:
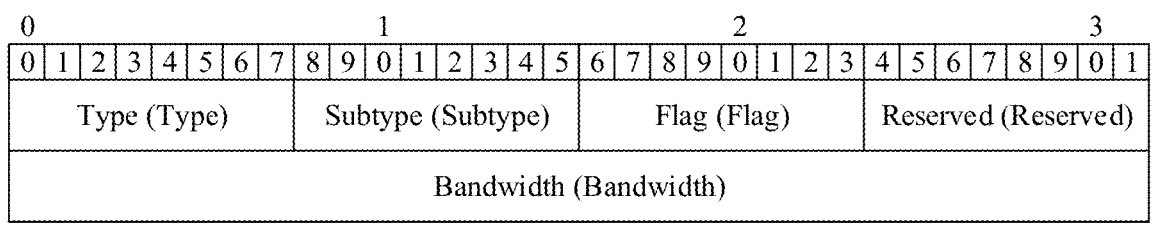
FIG. 4 is a schematic diagram of a format of a traffic suppression attribute according to an embodiment of this application.

An embodiment of this application provides a new BGP extended community attribute, and the new BGP extended community attribute may be referred to as a traffic suppression attribute used to carry the information 1. "Traffic suppression" in this application indicates that a rate of traffic is suppressed. The type of the rate can be the CIR or the PIR. A format of the traffic suppression attribute is shown in FIG. 4. A type field and a subtype field indicate a type of the traffic suppression attribute. A value of the type field is 0x06, and is used to indicate an EVPN. The subtype field indicates that the attribute is used for the traffic suppression. Different values of the subtype field indicate different functions. Values of the subtype field are applied for a standard organization based on the different functions. The different functions include but are not limited to: different values of the subtype field indicate that the traffic suppression attribute limits different types of rates, or a value of the subtype field indicates that the traffic suppression attribute indicates that different types of rates are limited by using information carried in another field. The another field may be, for example, a "flags" field, or a "reserved" field. A bandwidth field is used to carry rate information, for example, the information 1. A unit of the bandwidth field is, for example, kbps. If the traffic suppression attribute limits the CIR, when the network device 2 sends the traffic to the network device 1, the CIR cannot be greater than a value carried in the bandwidth field. Likewise, if the traffic suppression attribute limits the PIR, when the network device 2 sends the traffic to the network device 1, the PIR cannot be greater than the value carried in the bandwidth field.

In an embodiment, when a plurality of different types of rates need to be limited, a plurality of traffic suppression attributes, namely, a plurality of type-length-values (TLVs), may be carried in the BGP update message as required. For example, the BGP update message carries two traffic suppression attributes. One traffic suppression attribute is used to limit a first-type rate (for example, the CIR), and the other traffic suppression attribute is used to limit a second-type rate (for example, the PIR). The BGP message may further include information 2. The information 2 may also be referred to as rate information 2. The information 2 indicates a second maximum rate at which the network device 2 sends the traffic to the network device 1 based on the BGP EVPN route. The information 2 may be carried in the traffic suppression attribute. A type of a rate limited by the second maximum rate may be one of the CIR, the PIR, a CBS, a PBS, or an EBS. The type of the rate limited by the second maximum rate may also be another type of rate. It should be noted that the type of the rate limited by the first maximum rate and the type of the rate limited by the second maximum rate are different types. For example, when the type of the rate limited by the first maximum rate is the CIR, the type of the rate limited by the second maximum rate is the PIR.

The following describes what is the first-type rate and the second-type rate with reference to a specific example. The first-type rate may be, for example, the CIR, and the second-type rate may be, for example, the PIR. The first-type rate may be understood as a value of the CIR, and a rate type is the CIR. The second-type rate may be understood as a value of the PIR, and a rate type is the PIR. A person skilled in the art may understand that the CIR and the PIR both indicate a type of a rate and a value of the rate. When the value of the CIR is 10 megabits per second (Mbps), the first-type rate is 10 Mbps. When the value of the PIR is 20 Mbps, the second-type rate is 20 Mbps. It may be understood that the same traffic may comply with a plurality of constraint conditions at the same time. The plurality of constraint conditions may include the first maximum rate and the second maximum rate. For example, the first maximum rate and the second maximum rate are respectively 10 Mbps and 20 Mbps. When the value of the CIR of the traffic 1 is 10 Mbps (for example, equal to the first maximum rate), the value of the PIR of the traffic 1 may be 20 Mbps (for example, equal to the second maximum rate). Alternatively, when the value of the CIR of the traffic 1 is 9 Mbps (for example, less than the first maximum rate), the value of the PIR of the traffic 1 may be 19 Mbps (for example, less than the second maximum rate).

In an embodiment, the subtype field carries information 3. The information 3 may also be referred to as rate type information, and is used to indicate a rate type. For example, the information 3 indicates the type of the rate limited by the first maximum rate or the type of the rate limited by the second maximum rate. Different values of the subtype field may indicate limits of different types of rates. For example, when a value of the subtype field is 0x07, it indicates that the type of the rate limited by the traffic suppression attribute is the CIR. In other words, the traffic suppression attribute limits a maximum value of the CIR. Correspondingly, a value carried in the bandwidth field is the maximum value of the CIR. For another example, when a value of the subtype field is 0x08, it may indicate that the type of the rate limited by the traffic suppression attribute is the PIR. In other words, the traffic suppression attribute limits a maximum value of the PIR. Correspondingly, a value carried in the bandwidth field is the maximum value of the PIR.

In another embodiment, in order to perform traffic suppression on the different types of rates, a new subtype field may be defined. In the defined subtype field, different bits in the flags field and/or the reserved field are used to carry the information 3. In other words, the different bits in the flags field and/or the reserved field are used to distinguish the different rate types. Each bit may identify two different rate types based on different values. For example, a value of the subtype field is 0x09, it indicates that the traffic suppression attribute uses a bit in the flags field to distinguish the different rate types. For example, a bit T is defined in the flags field. When the value of subtype is 0x07, it indicates that the traffic suppression attribute with the subtype uses T in the flags field to map the different rate types. When a value of T is 0, it indicates that the traffic suppression attribute is used to limit the value of the CIR. When the value of T is 1, it indicates that the traffic suppression attribute limits the value of the PIR. A person skilled in the art may understand that the different rate types may be identified in a bit mapping manner by using only the bit in the flags field or only a bit in the reserved field. Certainly, the different rate types may also be limited by combining the bit in the flags field and the bit in the reserved field. These are obvious solutions that can be obtained by a person skilled in the art based on reading this application document. When the different types of rates need to be limited at the same time, the plurality of traffic suppression attributes may be carried in the BGP message. A specific implementation can be understood by a person skilled in the art, and details are not described herein.

In another embodiment, in order to perform traffic suppression on the different types of rates, a new subtype field may be defined. In the subtype field, different bits in the flags field and/or the reserved field are used to carry the information 3. In other words, the different bits in the flags field and/or the reserved field are used to distinguish the different rate types. Each bit is mapped to one rate type. For example, the value of the subtype field is 0x09, and it indicates that the traffic suppression attribute distinguishes the different rate types by using bits in the flags field. The flags field may include two bits, and each bit corresponds to one rate type. When each bit is set to 1, it indicates that the traffic suppression attribute is used to perform the rate suppression on a type of rate mapped to the bit.

In another embodiment, when the BGP update message advertises the MAC route, or the Ethernet A-D route is advertised in an MP2MP scenario, both the MAC route and the Ethernet A-D route are used to guide unicast packet forwarding. Therefore, the traffic suppression attribute carried in the BGP update message may be used to limit a rate of unicast traffic by default, and does not need to carry information indicating a traffic type. When the BGP update message is used to send an IMET route, the IMET route is used to guide BUM traffic forwarding. Therefore, the traffic suppression attribute carried in the BGP update message may be used to limit BUM traffic by default, and does not need to carry information used to identify a BUM traffic type. In this case, the traffic suppression attribute does not distinguish specific BUM traffic types and limits broadcast, multicast, and unknown unicast traffic at the same time. In other words, when forwarding the BUM traffic to the network device 1, the network device 2 performs traffic control on all BUM traffic based on the information 1 carried in the traffic suppression attribute carried in the received IMET route. For example, when the traffic suppression attribute is used to limit the PIR, and a value carried in the information 1 is 5000 kbps, and when the network device 2 sends the broadcast, multicast, or unknown unicast traffic to the network device 1, a maximum rate value of the PIR cannot be greater than 5000 kbps. The foregoing solution is easy to implement and can suppress different types of traffic at the same time, and helps reduce packet overheads.

In another embodiment, the BGP message further carries information 4. The information 4 may also be referred to as traffic type information, and is used to indicate a type of traffic that needs to be suppressed. For example, four bits are defined in the flags field of the traffic suppression attribute, and are respectively represented as B, M, U, and K. The four bits each indicate, in a bit mapping manner, that the traffic suppression is performed on the different traffic types. For example, when B=1, it indicates that broadcast traffic is suppressed. When M=1, it indicates that different rates of multicast traffic are suppressed. When U=1, it indicates that different rates of unknown unicast traffic are suppressed. When K=1, it indicates that different rates of unicast traffic are suppressed. A person skilled in the art may understand that, a bit 0 may also be used to identify suppression on the different traffic types. The foregoing solution may accurately control the different types of traffic separately, to improve traffic suppression accuracy.

A specific function of the traffic suppression attribute is described below by using an example with reference to FIG. 5. As shown in FIG. 5, a value 0x06 (which corresponds to 00000110 in binary) of the type field indicates an EVPN. A value 0x07 (which corresponds to 00000111 in binary) of the subtype field indicates that the traffic suppression attribute is used to limit the value of the CIR. B=1 in the flags field indicates suppression on the broadcast traffic. A value 10000 kbps of the bandwidth field indicates an expected value of a bandwidth for the network device 1 to receive broadcast traffic. In other words, when the network device 2 sends the broadcast traffic to the network device 1, the value of the CIR cannot exceed 10000 kbps.

S230: The network device 2 receives the BGP message sent by the network device 1.

The BGP message includes the EVPN NLRI and the information 1, and is used to advertise the BGP EVPN route to the second network device. The second network device is a BGP peer (peer) of the first network device. The first information indicates the first maximum rate at which the second network device sends the traffic to the first network device based on the EVPN NLRI.

S240: The network device 2 sends the traffic to the network device 1 at the first-type rate based on the EVPN NLRI and the information 1, where the first-type rate is less than or equal to the first maximum rate.

In an embodiment, the BGP message carries the traffic suppression attribute. The network device 2 obtains the EVPN NLRI and the traffic suppression attribute that are carried in the BGP message. The traffic suppression attribute includes the information 1, and may further include the information 2 and/or the information 3. A control plane (for example, a control board) of the network device 2 generates a BGP EVPN route entry based on the EVPN NLRI and the traffic suppression attribute. Different BGP EVPN route entries are separately generated based on different types of BGP EVPN routes carried in the EVPN NLRI. For example, when the BGP EVPN route advertised by the BGP message is the MAC route, the network device 2 generates a MAC route entry based on the BGP message. When the BGP EVPN route advertised by the BGP message is the Ethernet A-D route, the network device 2 generates an Ethernet A-D route entry based on the BGP message. When the BGP EVPN route advertised by the BGP message is the IMET route, the network device 2 generates an IMET route entry based on the BGP message. In the network device 2, different types of route entries are separately maintained and isolated from each other. The following uses the MAC route as an example to describe a process of generating a MAC route table and a MAC forwarding table in this application. For each of the IMET route and the Ethernet A-D route, a process in which a network device generates a corresponding route table and a corresponding forwarding table is similar to that for the MAC route, and details are not described in this application.

The network device 2 receives the BGP message sent by the network device 1, and generates the MAC route entry based on MAC route information carried in the BGP message. In a specific implementation, information carried in the traffic suppression attribute may be configured in the MAC route entry (as shown in Table 1). A destination MAC address of the MAC route entry is a MAC address (for example, a MAC1) included in the MAC route. A next-hop network address is a loopback address of the network device 1. A rate type is a type of a rate (for example, the CIR) limited by the traffic suppression attribute. A bandwidth value is a maximum rate (for example, 10000 kbps) carried in each traffic suppression attribute. When the BGP message carries a plurality of pieces of traffic suppression attribute information, the MAC route entry may store the plurality of different rate types and corresponding bandwidth values. For brevity, an example in which the BGP message carries one piece of traffic suppression attribute is used for description. The network device 2 generates the MAC forwarding entry (as shown in Table 2) based on the MAC route entry. The MAC forwarding entry is sent to a forwarding plane (for example, a forwarding board) of the network device 2. When generating the MAC forwarding entry based on the MAC route entry, the network device 2 may determine a destination MAC address and an outbound interface in the MAC forwarding entry based on the MAC route entry. The destination MAC address in the MAC forwarding entry is the destination MAC address in the MAC route entry. The outbound interface in the MAC forwarding entry is, for example, Intf1. That the network device 2 determines the Intf1 as the outbound interface in the MAC forwarding entry may include: The network device 2 first uses the loopback address of the network device 1 in the MAC route entry as a search keyword to search a table (also briefly referred to as an FTN mapping table or an FTN forwarding table) of mapping from a forwarding equivalence class (FEC) to a next hop label forwarding entry (NHLFE), to learn that an outbound interface corresponding to the loopback address of the network device 1 is a tunnel identifier (ID) of a tunnel from the network device 2 to the network device 1. Then, the network device 2 searches a tunnel forwarding table by using the tunnel ID, to learn that an outbound interface corresponding to the tunnel ID is the Intf1 (namely, an interface, on the network device 2, of the tunnel from the network device 1 to the network device 1). The network device 2 determines the Intf1 as the outbound interface in the MAC forwarding entry. It should be noted that the tunnel may be a label switched path (LSP) tunnel, a resource reservation protocol—traffic engineering (RSVP-TE) tunnel, or the like. The tunnel is used to carry a known unicast data flow. For brevity, this is not shown in the accompanying drawings of the embodiments of the present invention. This can be understood by a person skilled in the art. When the BGP message carries the plurality of traffic suppression attributes, rate types and corresponding bandwidth values that are carried in the plurality of traffic suppression attributes are respectively stored in the MAC route entry and the MAC forwarding entry. For example, when the BGP message further carries a traffic suppression attribute used to suppress a rate 2, a rate type and a bandwidth value that are carried in a traffic suppression attribute 2 are respectively stored in a type 2 and a bandwidth 2 shown in the following Table 1 and Table 2.

TABLE 1

MAC route entry

| Destination MAC | Next-hop network address | Type 1 | Bandwidth 1 | Type 2 | Bandwidth 2 |
|---|---|---|---|---|---|
| MAC 1 | Loopback address of a network device 1 | CIR | 10000 | . . . | . . . |

TABLE 2

MAC forwarding entry

| Destination MAC | Outbound interface | Type 1 | Bandwidth 1 | Type 2 | Bandwidth 2 |
|---|---|---|---|---|---|
| MAC 1 | Intf1 | CIR | 10000 | . . . | . . . |

Table 1 and Table 2 list only part of information in the MAC route entry and the MAC forwarding entry, and other information is not shown for brevity. This can be understood by a person skilled in the art.

When the network device 2 receives the known unicast traffic, for example, the destination MAC address carried in a packet is the MAC address (the MAC 1) included in the MAC route, the network device 2 queries the MAC forwarding table to learn information about a forwarded outbound interface, and learns that when the traffic is forwarded to the MAC 1, the rate of the CIR required by a remote device cannot exceed 10000 kbps. In this case, the network device 2 determines a local-end traffic suppression solution. For example, the network device 2 determines a value of a CIR specified in committed access rate (CAR) limit at the local end, compares the value with the maximum value of the CIR that can be received by the network device 1, selects a smaller value as an upper limit of the CIR, and sends the packet. Therefore, when the local-end rate limit of the network device 2 is greater than the maximum value of the CIR that can be received by the network device 1, the network device 2 sends the traffic based on an obtained traffic requirement sent by the remote device, to effectively avoid sending part of invalid traffic that exceeds a bandwidth. This reduces a public network bandwidth resource occupied by the invalid traffic and reduces a traffic processing pressure of the remote device.

In this application, when advertising the MAC route to the network device 2, the network device 1 may advertise the MAC route based on a MAC-VRF instance. In other words, all MAC routes learned from a same MAC-VRF instance carry a same traffic suppression attribute. Alternatively, when advertising the MAC route to the network device, the network device 1 may separately perform the traffic suppression based on different MAC addresses. Therefore, the traffic suppression may be performed on traffic sent to some MAC addresses, or the traffic suppression is not performed on traffic sent to some MAC addresses. It should be noted that, if the value of the bandwidth field in the traffic suppression attribute is 0, when receiving traffic sent to corresponding MAC, the network device 2 discards all the traffic.

The following examples describe how to apply traffic suppression attributes to different types of BGP EVPN routes with a specific application scenario. It should be understood that the following scenario and specific application should not constitute a limitation on the solutions of this application.

Scenario 1: In an MP2MP Scenario, the Traffic Suppression Attribute is used in the MAC Route.

In an EVPN network, the MAC route is used to guide unicast packet forwarding. Therefore, the traffic suppression attribute is used to suppress a bandwidth of the unicast traffic in the MAC route. As shown in FIG. 5a, the traffic suppression attribute is used in the MAC route.

With reference to FIG. 1, when the PE 2 advertises the MAC route to the PE 1, a process of establishing information in the control plane is as follows:

The PE 2 sends the MAC route whose source MAC is the MAC 1 to the PE 1. The MAC route carries the traffic suppression attribute. For example, the flags field in the traffic suppression attribute includes four bits. The four bits are respectively B, M, U, and K. The four bits respectively indicate that limited traffic types are the broadcast traffic, the multicast traffic, the unknown unicast traffic, and the known unicast traffic. In the following several scenarios, an example in which the flags field includes the four bits is used for description. For brevity, details are not described below. When the BGP message advertises the MAC route, Subtype=0x06 indicates that the rate of the CIR is limited. In the following scenarios, an example in which Subtype=0x06 is used for description. The bandwidth value carried in the traffic suppression attribute indicates the maximum CIR value. For brevity, details are not described below. If K is set to 1, and other bits are set to 0 and check can be ignored on traffic corresponding to the other bits, and it indicates that the CIR of the unicast traffic sent to the MAC needs to be suppressed. A maximum allowed bandwidth bandwidth carried in the traffic suppression attribute is 10000 kbps. In other words, the maximum value of the CIR that the PE 2 can receive does not exceed 10000 kbps. Therefore, when the PE 1 sends the traffic to the PE 2 based on the MAC route, the CIR needs to be less than or equal to 10000 kbps.

When the PE 1 forwards the traffic to the PE 2, a process of establishing information in a forwarding plane is as follows:

When sending a unicast packet whose destination MAC is the MAC 1, the PE 1 finds the MAC in the MAC route. The maximum value of the CIR of the unicast packet is 10000 kbps. The PE 1 compares the maximum value with a local interface bandwidth. If the rate is greater than the local interface bandwidth, the PE 1 discards traffic whose rate exceeds the value, and normally forwards traffic whose rate is smaller than the value.

Scenario 2: The Traffic Suppression Attribute is used in the Per-AD-EVI Route.

In an MP2MP service, when Per-AD-EVI route is advertised, the carried traffic suppression attribute is used to control a total volume of unicast traffic sent to the EVPN instance. Similar to a case of the application of the MAC route in Scenario 1. The bit K in the flags field of the traffic suppression attribute is set to 1, and other bits are set to 0 and the check can be ignored on traffic corresponding to the other bits. Part of unicast traffic whose rate exceeds the bandwidth in all unicast traffic sent by a remote EVPN is discarded.

In the P2P EVPN service, the per-AD-EVI route is used to guide the packet forwarding. All packets are processed in a broadcast manner. Therefore, in the P2P scenario, the BGP message carries the traffic suppression attribute when the per-AD-EVI route is advertised. The traffic suppression attribute is used to suppress the traffic of the broadcast packets. For example, in the flags field of the traffic suppression attribute, B=1, and the check can be ignored on the traffic corresponding to the other bits. The traffic whose rate exceeds the bandwidth limit is discarded. If the bandwidth value is 0, all unicast traffic sent to the MP2MP EVPN or all traffic sent to the P2P EVPN is discarded.

Scenario 3: The Traffic Suppression Attribute is used in the IMET Route.

In the EVPN network, the IMET route is used to guide BUM packet forwarding. When the IMET route is advertised, B, U, and M in the flags field of the traffic suppression attribute can be set to 1, K can be set to 0 and the check can be ignored on traffic corresponding to the bit K. It indicates that corresponding BUM traffic is suppressed. When B=1, it indicates that the broadcast traffic needs to be suppressed. Part of traffic whose rate exceeds the bandwidth is discarded. When M=1, it indicates that the multicast traffic needs to be suppressed. Part of traffic whose rate exceeds the bandwidth is discarded. When U=1, it indicates that the unknown unicast traffic needs to be suppressed. Part of traffic whose rate exceeds the bandwidth is discarded. The bits B, M, and U can be set separately or together. When a plurality of bits are set to 1, it indicates that traffic represented by a corresponding bit is suppressed based on the bandwidth. If the bandwidth is 0, it indicates that this type of traffic is not required and the remote end discards all the traffic. If different BUM traffic needs to be suppressed using different bandwidths, a route needs to carry a plurality of traffic suppression attributes. In other words, the route needs to carry a plurality of TLVs to suppress the different types of traffic. When a plurality of interfaces are connected to a PE, different interfaces may have different bandwidth suppression requirements. In this case, the bandwidth in the traffic suppression attribute carried by the IMET route can be set to a maximum bandwidth of an interface. A BUM packet sent from the remote end can be suppressed according to a local traffic policy.

In this application, an existing static traffic deployment suppression solution is changed to a dynamic solution. To be specific, when the local device advertises the EVPN route to the remote device, a requirement of local traffic is dynamically advertised to the remote device. This simplifies a maintenance operation. In the prior art, the local PE device performs bandwidth control on traffic sent by the local PE to the remote PE or traffic received from the remote PE, to achieve a traffic suppression objective. The local PE device can manage only the traffic sent or received by the local end, but cannot control the traffic sent by the remote PE. Even if the traffic sent by the remote PE exceeds the bandwidth limit of the local PE, the traffic is still transmitted to the local PE over the public network. After reaching the local PE, the traffic that exceeds the bandwidth limit is discarded by the local PE. The traffic discarded by the local PE occupies the bandwidth of an operator network when being transmitted over the operator network. In addition, during traffic transmission and processing, extra overheads are required when a peer device sends the invalid traffic, and overheads are also required when an operator device and the local PE device process the invalid traffic. According to the solution provided in this application, a bandwidth of the known unicast traffic or the BUM traffic sent by the remote device can be accurately controlled provided that the local device is maintained. The invalid traffic that exceeds the bandwidth limit of the local device will not be transmitted to the local device over the public network. This reduces the public network bandwidth occupied by the invalid traffic and reduces overheads of processing large amount of invalid traffic by the local device, the remote device, and the operator device.

Figure 6:
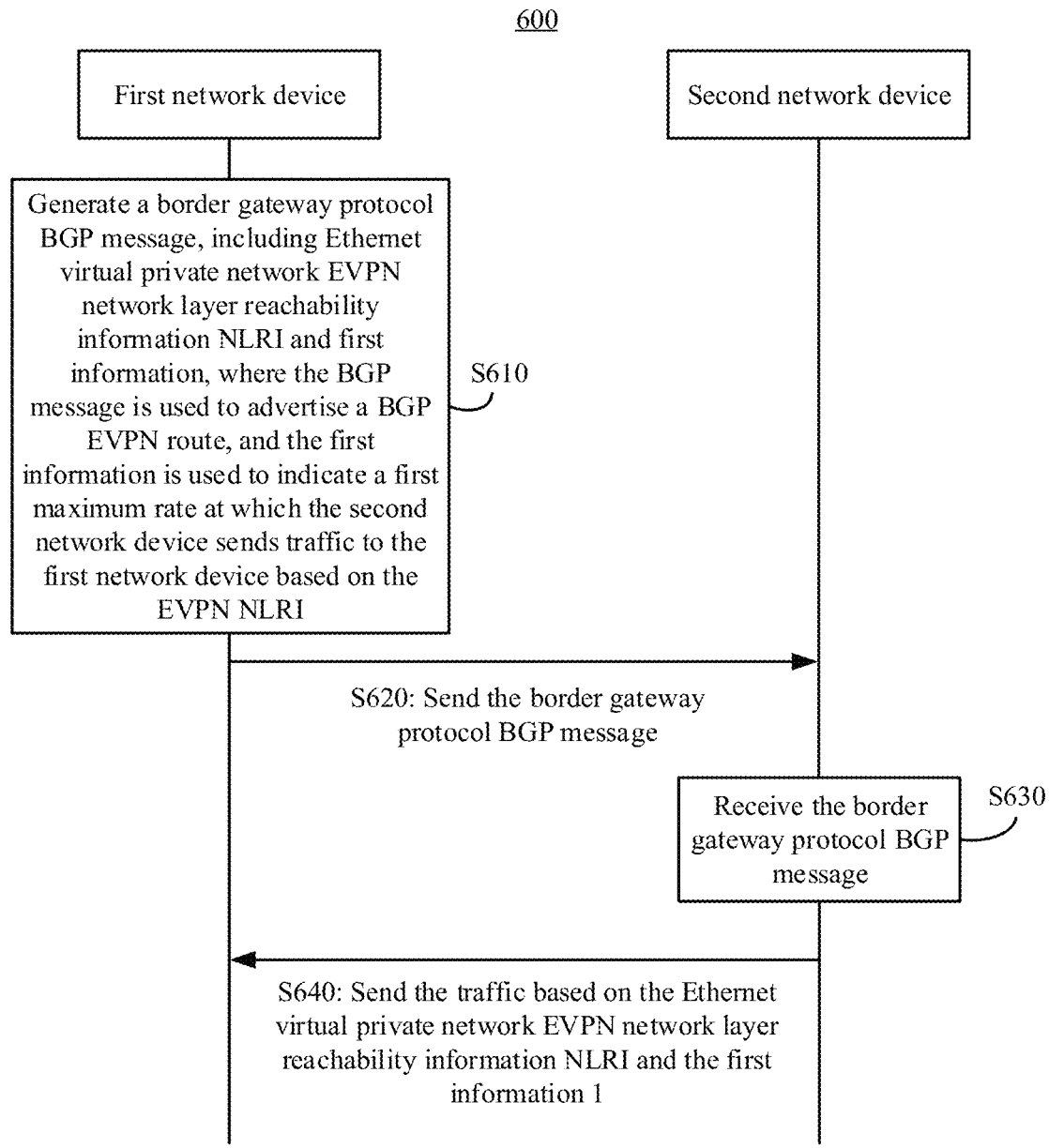
FIG. 6 is a schematic flowchart of a message sending and receiving method according to an embodiment of this application.

FIG. 6 shows a message sending and receiving method according to an embodiment of this application. A network architecture to which the method 600 is applied includes at least a first network device and a second network device. The first network device and the second network device are a pair of BGP peers. Both the first network device and the second network device may be PE devices. For example, the first network device may be the PE 2 shown in FIG. 1, and the second network device may be the PE 1 shown in FIG. 1. The network architecture may be a network architecture shown in FIG. 1. In addition, the method shown in FIG. 6 may be used to implement the method shown in FIG. 2. For example, the first network device and the second network device in FIG. 6 may be the network device 1 and the network device 2 in FIG. 2 respectively. The method shown in FIG. 6 includes the following content.

S610: The first network device generates a border gateway protocol BGP message, where the BGP message includes EVPN NLRI and first information, and the first information indicates a first maximum rate at which the second network device sends traffic to the first network device based on the EVPN NLRI.

The BGP message is used to advertise a BGP EVPN route to the second network device, and the second network device is a BGP peer of the first network device.

S620: The first network device sends the BGP message to the second network device.

For details about how the first network device advertises the BGP EVPN route to the second network device, refer to the related descriptions in the method 200. Details are not described herein again.

S630: The second network device receives the BGP message.

S640: The second network device sends the traffic to the first network device at a first-type rate based on the EVPN NLRI and the first information, where the first-type rate is less than or equal to the first maximum rate.

In an embodiment, a rate limited by the first maximum rate may be a CIR or a PIR. The first-type rate is the same as the rate limited by the first maximum rate. For example, the rate limited by the first maximum rate is the CIR, and the first-type rate is also the CIR. The rate limited by the first maximum rate is the PIR, and the first-type rate is also the PIR.

In a specific implementation, the BGP message further includes second information. The second information is used to indicate a second maximum rate at which the second network device sends the traffic to the first network device based on a BGP EVPN NLRIN route. A type of the rate limited by the first maximum rate is different from a type of a rate limited by the second maximum rate. The method 600 further includes:

The second network device sends the traffic to the first network device at a second-type rate based on the EVPN NLRI and the second information. The second-type rate is less than or equal to the second maximum rate.

The type of the rate limited by the second maximum rate may be the CIR or the PIR, and the second-type rate is the same as the rate limited by the second maximum rate. For example, the rate limited by the second maximum rate is the CIR, and the second-type rate is also the CIR. The rate limited by the second maximum rate is the PIR, and the second-type rate is also the PIR.

In an embodiment, the BGP message further includes third information, and the third information is used to indicate the type of the rate limited by the first maximum rate.

In an embodiment, the BGP message further includes fourth information, and the fourth information is used to indicate a type of the traffic.

In an embodiment, the first information, the second information, the third information, and/or the fourth information are/is each carried in an extended community attribute of the BGP message. For example, the extended community attribute may be defined as a traffic suppression attribute. For related descriptions of the traffic suppression attribute, refer to the method 200. Details are not described herein again.

The foregoing describes the message sending and receiving methods according to the embodiments of this application with reference to FIG. 2 to FIG. 6. The following describes network devices corresponding to the foregoing method embodiments with reference to FIG. 7 and FIG. 8.

Figure 7:
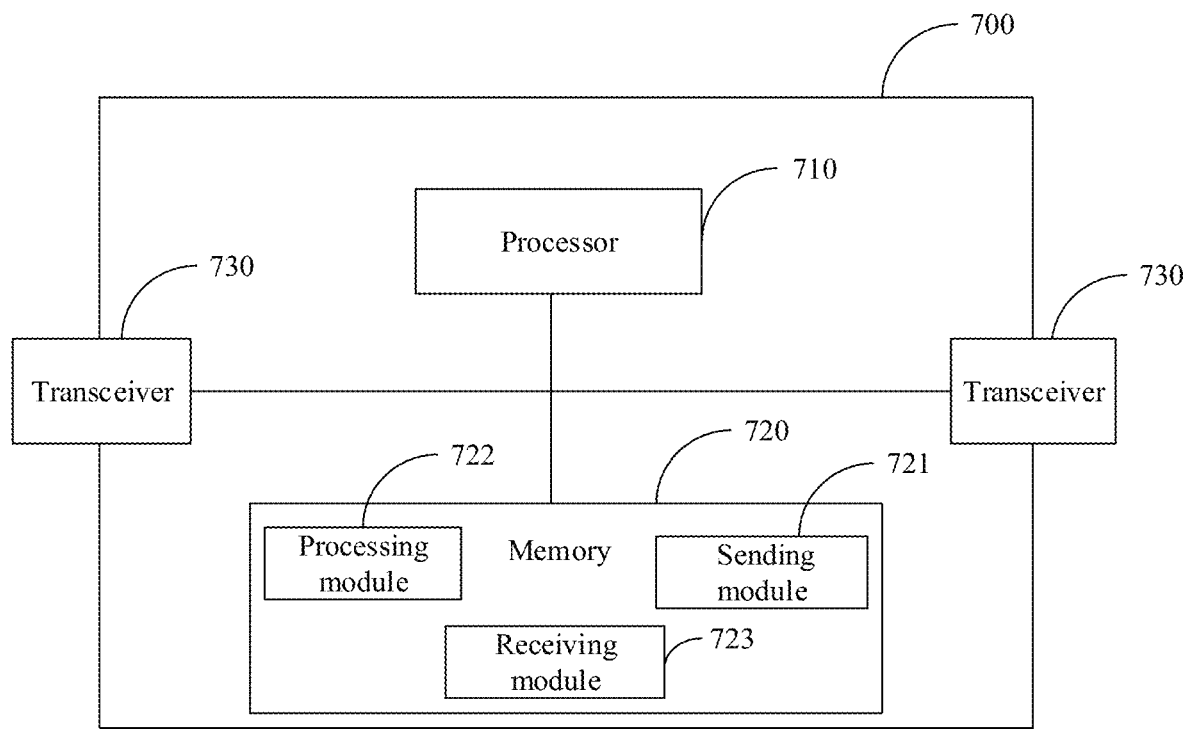
FIG. 7 is a schematic diagram of a structure of a first network device according to an embodiment of this application.

FIG. 7 is a schematic diagram of a network device 700 according to an embodiment of this application. The network device 700 may be used in the network architecture shown in FIG. 1, and may be, for example, the PE 2 in the network architecture shown in FIG. 1. The network device 700 is configured to perform the operations performed by the network device 1 in the method 200 or the operations performed by the first network device in the method 600. As shown in FIG. 7, the network device 700 may include a processor 710, and a memory 720 and a transceiver 730 that are coupled to the processor 710. The processor 710 may be a central processing unit (CPU for short), a network processor (NP for short), or a combination of a CPU and an NP. The processor may further include a hardware chip. The hardware chip may be an application-specific integrated circuit (ASIC for short), a programmable logic device (PLD for short) or a combination thereof. The PLD may be a complex programmable logic device (CPLD for short), a field-programmable gate array (FPGA for short), generic array logic (GAL for short), or any combination thereof. The processor 710 may be one processor, or may include a plurality of processors. The memory 720 may include a volatile memory, for example, a random-access memory (RAM for short), or the memory may include a non-volatile memory, for example, a read-only memory (ROM for short), a flash memory, a hard disk drive (HDD for short), or a solid-state drive (SSD for short). Alternatively, the memory may include a combination of the foregoing types of memories. The memory 720 may be one memory, or may include a plurality of memories. In an implementation, the memory 720 may include a plurality of software modules, for example, a sending module 721, a processing module 722, and a receiving module 723. After executing each software module, the processor 710 may perform a corresponding operation according to indication of each software module. In an embodiment, an operation performed by a software module is actually an operation performed by the processor 710 according to indication of the software module. The processing module 722 may be configured to generate a border gateway protocol BGP message. The BGP message includes EVPN NLRI and first information. The first information indicates a first maximum rate at which the second network device sends traffic to the first network device based on the EVPN NLRI. The sending module 721 may be configured to send the BGP message to the network device 2. In addition, after executing a computer-readable instruction in the memory 720, the processor 710 may perform, according to indication of the computer-readable instruction, all operations that can be performed by the network device 1 or the first network device, for example, operations performed by the network device 1 in the embodiments corresponding to FIG. 2 to FIG. 5, or operations performed by the first network device in the embodiment corresponding to FIG. 6.

Figure 8:
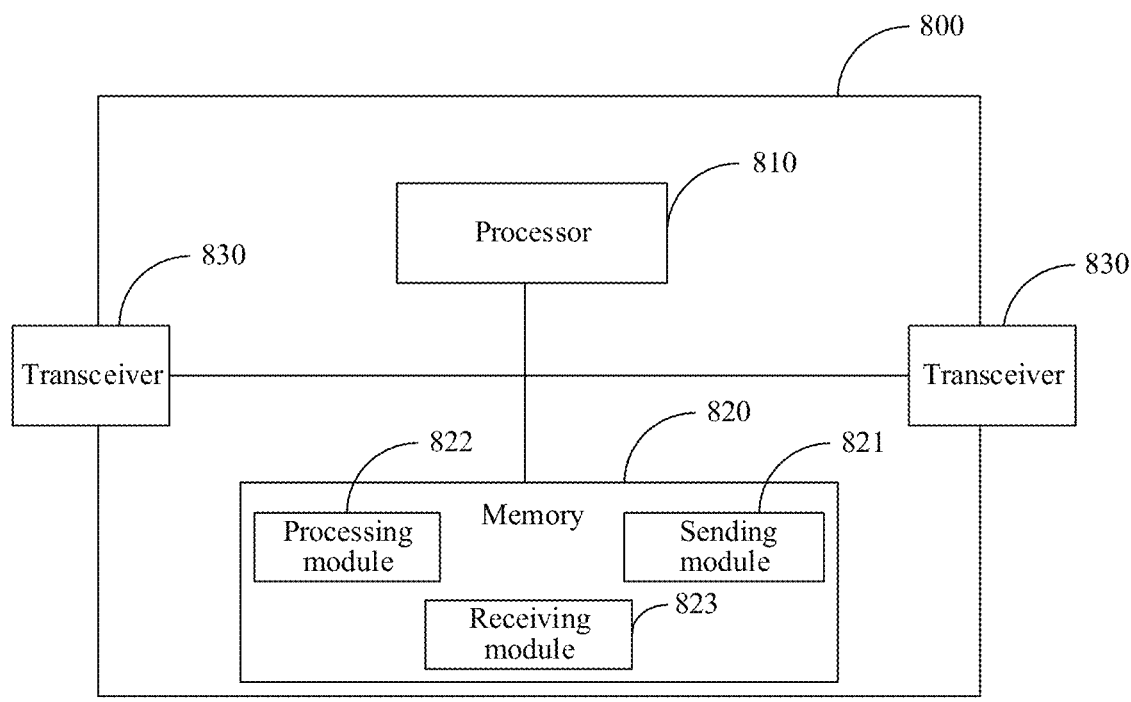
FIG. 8 is a schematic diagram of a structure of a second network device according to an embodiment of this application.

FIG. 8 is a schematic diagram of another network device 800 according to this application. The network device 800 may be used in the network architecture shown in FIG. 1, and may be, for example, the PE 1 in the network architecture shown in FIG. 1. The network device 800 is configured to perform the operations performed by the network device 2 in the method 200 or the operations performed by the second network device in the method 600. As shown in FIG. 8, the network device 800 may include a processor 810, and a memory 820 and a transceiver 830 that are coupled to the processor 810. The processor 810 may be a CPU, an NP, or a combination of a CPU and an NP. The processor may further include a hardware chip. The hardware chip may be an ASIC, a PLD, or a combination thereof. The PLD may be a CPLD, an FPGA, GAL, or any combination thereof. The processor 810 may be one processor, or may include a plurality of processors. The memory 820 may include a volatile memory, for example, a RAM; or the memory may include a non-volatile memory, for example, a ROM, a flash memory, an HDD, or an SSD. Alternatively, the memory may include a combination of the foregoing types of memories. The memory 820 may be one memory, or may include a plurality of memories. In an implementation, the memory 820 may include a plurality of software modules, for example, a sending module 821, a processing module 822, and a receiving module 823. After executing each software module, the processor 810 may perform a corresponding operation according to indication of each software module. In an embodiment, an operation performed by a software module is actually an operation performed by the processor 810 according to indication of the software module. The receiving module 823 is configured to receive a BGP message from a first network device. The BGP message includes Ethernet virtual private network network layer reachability information EVPN NLRI and first information. The first information indicates a first maximum rate at which the second network device sends traffic to the first network device based on the EVPN NLRI. The processing module 822 is configured to generate the traffic based on the EVPN NLRI and the first information. The sending module 821 is configured to send to the first network device at a first-type rate, the traffic generated by the processing module 822. The first-type rate is less than or equal to the first maximum rate. In addition, after executing a computer-readable instruction in the memory 820, the processor 810 may perform, according to indication of the computer-readable instruction, all operations that can be performed by the network device 2 or the second network device, for example, the operations performed by the network device 2 in the embodiments corresponding to FIG. 2 to FIG. 5, or the operations performed by the second network device in the embodiment corresponding to FIG. 6.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented by using software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

All parts in this specification are described in a progressive manner. For same or similar parts in the embodiments, mutual reference may be made. Each embodiment focuses on a difference from other embodiments. Especially, apparatus and system embodiments are basically similar to the method embodiments, and therefore are described briefly. For related parts, refer to partial descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first network device, comprising:
a processor; and
a memory storing computer-readable instructions, which when executed by the processor, cause the processor to perform following operations:
generating, by the first network device, a border gateway protocol (BGP) message, wherein the BGP message comprises Ethernet virtual private network network layer reachability information (EVPN NLRI), first information indicating a first maximum rate at which a second network device sends traffic to the first network device based on the EVPN NLRI, and second information indicating a type of the traffic with a type rate being less than or equal to the first maximum rate, the type of the traffic being one of a unicast traffic, a multicast traffic, and a broadcast traffic, wherein the EVPN NLRI is an NLRI associated to an EVPN;
sending, by the first network device, the BGP message to the second network device; and
receiving, by the first network device, the traffic from the second network device at the type rate limited by the first maximum rate, wherein the type rate is a committed information rate (CIR) or a peak information rate (PIR) and a type of the received traffic corresponds to the type of traffic as indicated by the second information, wherein the first information is carried in an extended community attribute of the BGP message.

2. The first network device according to claim 1, wherein the BGP message further comprises third information indicating a second maximum rate at which the second network device sends the traffic to the first network device based on the EVPN NLRI, and a type of a rate limited by the first maximum rate is different from a type of a rate limited by the second maximum rate; and
the rate limited by the first maximum rate is the committed information rate (CIR), and the rate limited by the second maximum rate is the peak information rate (PIR); or
the rate limited by the first maximum rate is the PIR, and the rate limited by the second maximum rate is the CIR.

3. The first network device according to claim 1, wherein the BGP message further comprises fourth information indicating the type of the rate limited by the first maximum rate.

4. The first network device according to claim 2, wherein the BGP message further comprises fourth information indicating the type of the rate limited by the first maximum rate.

5. The method of claim 1, wherein the traffic comprises EVPN traffic and the second network device avoids sending part of the traffic that is invalid to reduce a bandwidth of a public network that would be occupied by invalid traffic.

6. The method of claim 5, wherein the invalid traffic comprises traffic that is sent by the second network device to the first network device based on the EVPN NLRI over the public network and the invalid traffic would be discarded by the first network device in response to a rate of the traffic exceeding a maximum receive rate of the first network device.

7. A second network device, comprising:
a processor; and
a memory storing computer-readable instructions, which when executed by the processor, cause the processor to perform following operations:
receiving a border gateway protocol (BGP) message from a first network device, wherein the BGP message comprises Ethernet virtual private network network layer reachability information (EVPN NLRI), first information indicating a first maximum rate at which the second network device sends traffic to the first network device based on the EVPN NLRI, and second information indicating a type of the traffic with a type rate being less than or equal to the first maximum rate, the type of the traffic being one of a unicast traffic, a multicast traffic, and a broadcast traffic, wherein the EVPN NLRI is an NLRI associated to an EVPN; and
sending the traffic to the first network device at the type rate based on the EVPN NLRI, the first information, and the second information, wherein the first network device is to receive the traffic from the second network device at the type rate and the type rate is less than or equal to the first maximum rate, wherein the type rate is a committed information rate (CIR) or a peak information rate (PIR) and a type of the sent traffic corresponds to the type of traffic as indicated by the second information, wherein the first information is carried in an extended community attribute of the BGP message.

8. The second network device according to claim 7, wherein the BGP message further comprises third information indicating a second maximum rate at which the second network device sends the traffic to the first network device based on the EVPN NLRI, a type of a rate limited by the first maximum rate is different from a type of a rate limited by the second maximum rate, and wherein sending the traffic to the first network device at the type rate based on the EVPN NLRI comprises:
sending the traffic to the first network device at the type rate based on the EVPN NLRI, the first information, and the third information.

9. The second network device according to claim 7, wherein the BGP message further comprises fourth information indicating the type of the rate limited by the first maximum rate.

10. The second network device according to claim 7, wherein the traffic comprises EVPN traffic and the second network device avoids sending part of the traffic that is invalid to reduce a bandwidth of a public network that would be occupied by invalid traffic.

11. The second network device according to claim 10, wherein the invalid traffic comprises traffic that is sent by the second network device to the first network device based on the EVPN NLRI over the public network and the invalid traffic would be discarded by the first network device in response to a rate of the traffic exceeding a maximum receive rate of the first network device.

12. A communications system, comprising:
a first network device; and
a second network device,
wherein the first network device is to generate a border gateway protocol (BGP) message comprising Ethernet virtual private network network layer reachability information (EVPN NLRI), first informationindicating a first maximum rate at which the second network device sends traffic to the first network device based on the EVPN NLRI, and second information indicating a type of the traffic with a type rate being less than or equal to the first maximum rate, the type of the traffic being one of a unicast traffic, a multicast traffic, and a broadcast traffic, and the first network device is to send the BGP message to the second network device, wherein the EVPN NLRI is an NLRI associated to an EVPN;
wherein the second network device is to receive a-the BGP message from the first network device, the BGP message comprising the EVPN NLRI, the first information, and the second information, and the second network device is to send the traffic to the first network device at a type rate based on the EVPN NLRL, first information, and the second information, wherein the type rate is less than or equal to the first maximum rate, wherein the type rate is a committed information rate (CIR) or a peak information rate (PIR) and the type of the sent traffic corresponds to the type as indicated by the second information; and
wherein the first network device is to receive the traffic from the second network device at the type rate limited by the first maximum rate and a type of the received traffic corresponds to the type of traffic as indicated by the second information, wherein the first information is carried in an extended community attribute of the BGP message.

13. The communications system according to claim 12, wherein the traffic comprises EVPN traffic and the second network device avoids sending part of the traffic that is invalid to reduce a bandwidth of a public network that would be occupied by invalid traffic.

14. The communications system according to claim 13, wherein the invalid traffic comprises traffic that is sent by the second network device to the first network device based on the EVPN NLRI over the public network and the invalid traffic would be discarded by the first network device in response to a rate of the traffic exceeding a maximum receive rate of the first network device.

* * * * *

UNITED STATES PATENT AND TRADEMARK OFFICE
CERTIFICATE OF CORRECTION

PATENT NO. : 11,895,021 B2
APPLICATION NO. : 17/135097
DATED : February 6, 2024
INVENTOR(S) : Kun Zhao It is certified that error appears in the above-identified patent and that said Letters Patent is hereby corrected as shown below:

In the Claims

In Claim 12, Column 24, Line 24, delete "receive a-the BGP" and insert --receive the BGP--.

In Claim 12, Column 24, Line 29, delete "based on the EVPN NLRL" and insert --based on the EVPN NLRI--.

Signed and Sealed this
Thirtieth Day of April, 2024

Katherine Kelly Vidal
*Director of the United States Patent and Trademark Office*